United States Patent [19]

Ackley

[11] 4,413,556
[45] * Nov. 8, 1983

[54] MATERIAL ORIENTATION APPARATUS AND METHOD

[76] Inventor: Michael Ackley, 1273 N. Church St., Moorestown, N.J. 08057

[*] Notice: The portion of the term of this patent subsequent to May 12, 1998 has been disclaimed.

[21] Appl. No.: 262,612

[22] Filed: May 11, 1981

Related U.S. Application Data

[63] Continuation of Ser. No. 954,243, Oct. 24, 1978, Pat. No. 4,266,477.

[51] Int. Cl.³ .................... B41F 17/36; B65G 47/24
[52] U.S. Cl. ................................. 101/40; 198/416
[58] Field of Search ............... 198/380, 384, 416; 193/47; 101/40, 426

[56] References Cited

U.S. PATENT DOCUMENTS

| | | | |
|---|---|---|---|
| 3,918,575 | 11/1975 | Carlson et al. | 198/416 |
| 4,104,966 | 8/1978 | Ackley, Jr. et al. | 198/380 X |
| 4,231,462 | 11/1980 | Ackley, Sr. et al. | 198/380 |
| 4,266,477 | 5/1981 | Ackley | 198/384 X |
| 4,353,456 | 10/1982 | Yamamoto | 198/384 X |

Primary Examiner—Jeffrey V. Nase
Attorney, Agent, or Firm—Weiser & Stapler

[57] ABSTRACT

An apparatus and process for transporting and orienting materials which have dissimilar ends, like capsules, to and in a predetermined orientation and position. The apparatus includes two rotatable drums in tangential arrangement. Each drum includes a plurality of peripherally spaced pockets sized and shaped to receive and carry individual capsules. Means are provided for each drum to orient certain preselected capsules from a radial to a longitudinal position with a selected end trailing; the capsules are delivered to a conveyor means for further processing, like printing, such as spin-printing.

8 Claims, 6 Drawing Figures

MATERIAL ORIENTATION APPARATUS AND METHOD

This is a continuation, of application Ser. No. 954,243, filed Oct. 24, 1978, now U.S. Pat. No. 4,266,477.

TECHNICAL FIELD

This application relates generally to the field of capsule orienting apparatus and more particularly, is directed to a multi-drum type of capsule orientation of rectification apparatus including a plurality of tangentially registered pockets which function with exteriorly positioned air jet guides and other means to uniformly orient randomly fed capsules.

It is the usual practice to package medicinal compounds and other materials suitable for ingestion in capsules which are made and used in very large numbers. The capsules generally consist of bodies of predetermined size and configuration to hold the medicinal and other compounds and caps which are telescopically arranged over the bodies to retain the filled material therewithin.

During the processing of the capsules which may be filled or empty, it is common practice to imprint indicia over the surface of the capsule, for example the name of the manufacturer or of the name or batch number of the material packaged within the capsule or other information required by the Food and Drug Administration or other agencies. This can be done by "spin printing" an elongated indicia on the capsule or by printing the capsule in another suitable manner. Spin printing is accomplished by causing the capsule to spin about its axis as the indicia is imprinted upon the surface of the capsule. The capsules may be uniformly oriented or rectified prior to reaching the imprinting station while the capsules can be uniformly rotated during the imprinting operation. The rotation occurs in a manner which allows rotation of the capsule without substantial slippage between the imprinting head and the capsule surface whereby a sharp, precise, printed indicia can be produced on each capsule as it passes through the imprinting station.

BACKGROUND OF THE INVENTION

Prior workers in the art have developed apparatus capable of transporting, orienting, rectifying and in other appropriate ways positioning, etc. capsules such as are disclosed in the following U.S. Pat. Nos., which may be considered representative of the prior art:

2,785,786, R. J. Bartlett, CONVEYING APPARATUS
2,859,689, A. Ackley, PELLET MARKING MACHINE
2,931,292, C. E. Ackley, MARKING MACHINE
2,982,234, C. E. Ackley and John Kane, METHOD OF PRINTING WAXED PELLETS, AND PRINTING INK
3,026,792, J. J. Miskel et al, APPARATUS FOR BRANDING UNIFORMLY-SHAPED ARTICLES
3,042,183, C. E. Ackley, ARTICLE HANDLING APPARATUS
3,200,556, C. E. Ackley, CAPSULE SEALING METHOD AND APPARATUS
3,272,118, C. E. Ackley, ARTICLE MARKING MACHINE
3,613,861, Alten E. Whitecar, CAPSULE ORIENTING MACHINE
3,739,909, Garland et al, CAPSULE HANDLING APPARATUS AND METHOD
3,838,766, Wagers, Jr. et al, CAPSULE INSPECTION APPARATUS AND METHOD
3,868,900, Edward M. Ackley, CAPSULE PRECISION PRINTING APPARATUS AND METHOD
3,871,295, Edward M. Ackley, CAPSULE ORIENTING APPARATUS AND METHOD OF SPIN PRINTING
3,884,143, Edward M. Ackley, CONVEYOR LINK FOR TABLET PRINTING APPARATUS
3,912,120, Hoppmann et al, CENTRIFUGAL METHOD OF SORTING AND ORIENTING PARTICULATE ARTICLES
3,917,055, VandenBerg et al, CAPSULE RECTIFICATION APPARATUS
3,931,884, Edward M. Ackley, APPARATUS FOR TRANSPORTING AND ORIENTING CAPSULES
4,069,753, Edward M. Ackley, deceased, APPARATUS AND METHODS FOR THE RANDOM SPIN PRINTING OF CAPSULES U.S. Pat. Nos. 3,931,884 and 4,069,753 show "spin printing" apparatus, and U.S. Pat. Nos. 2,785,786, 2,859,689, 3,026,792 and 3,424,082, show other apparatus and method for branding or printing indicia on the article.

The present apparatus represents an improvement over the prior art capsule orientation machines for many reasons, e.g. more versatile, greater efficiency and for other reasons as will become apparent from the further desception. It provides a reliable, automatic and rapidly functioning device capable of rapidly and uniformly orienting a plurality of randomly fed capsules.

In view of these patents and a fairly advanced state of technology, the present machinery and method is quite unobvious and represents a further significant advance in the art.

DISCLOSURE OF THE INVENTION

In accordance with the present invention, capsules comprising a body and a telescopically arranged cap are loaded from a supply hopper individually into a plurality of peripheral cavities or pockets which are provided about the periphery of a feed drum. Each of the pockets is similarly formed and is characterized by a radially extending portion and a communicating longitudinally or circumferentially extending portion. The capsules are fed from the hopper and may be randomly received in the feed drum pockets, but preferably, the capsules are fed in radial orientation to the radially directed portion. In other of the pockets, the capsules may be in longitudinal orientation within the circumferentially directed portion. Either the body or the cap may be positioned radially inwardly within the radial portions of the pockets and either the body or the cap may be positioned in the leading or forward position within the longitudinal portions of the pockets in view of the random feeding from the hopper. Thus, the capsules are randomly positioned each in one pocket either in the longitudinal or radial pockets, which are at a 90° angle with respect to each other in one single plane.

Optionally, a vacuum chest is located immediately adjacent the inner surface of the feed drum if it is desired to assist the positioning of the capsule in the pocket in radial position.

A brush means which may be rotating is positioned downstream from the feed hopper and is positioned in tangential arrangement with the feed drum.

When, as described, a capsule is seated on the radial cavity of the pocket, a capsule which falls into the longitudinal cavity will not fit into it because of the radially seated capsule, may, however, partially be in the longitudinal cavity. The brush means assists to dislodge any such longitudinal capsules.

Thus, at this phase of the operation, the pockets have their cavity occupied by either a longitudinally or radially seated capsule as the feed drum rotates each pocket away from the rotating brush means.

If preferred, the position of the brush and vacuum means may be interchanged, so that the vacuum chest will assist in positioning all radially oriented capsules.

The apparatus includes a sizing block and back guide circumferentially arranged in overlying relationship to the feed drum downstream of the vacuum and brush means when these are used. The sizing block and back guide means comprises a circumferential channel or slot of sufficient size to receive the capsule body in rotary, sliding engagement therewithin and of insufficient size to permit the capsule cap to enter and rotatably slide therewithin.

The sizing block and back guide means further comprises an air jet oriented to direct a jet stream of air upon each respective pocket as the pocket is rotated beneath the air jet. The air jet operates to lift the radially seated capsule upwardly on an air cushion to bring it out of the cavity. The air jet impinges on the longitudinal cavity, then streams into the radial cavity to create the necessary uplift pressure.

The capsules which had randomly been positioned within the radial portion of the pocket with the cap radially inwardly (or downwardly) positioned and the body radially outwardly (or upwardly) positioned are urged upwardly or radially outwardly until the outward portion of the body enters the arcuate slot. There the capsule pivots from the radial position to the longitudinal position. The sizing block and back guide means then act to retain the capsule so pivoted in the longitudinally aligned position as the feed drum is rotated. Thus, the capsules which are longitudinally aligned are travelling with their cap portion trailing. The capsules which are remaining in the radially extending pocket, are processed as follows.

Those capsules originally oriented within the radially directed portions of the pocket with the cap facing radially outwardly will not be pivoted to the longitudinal position inasmuch as the arcuate slot is of insufficient width to receive the cap rotary, sliding engagement therewithin. Accordingly, the action of the air jet will merely serve to slightly elevate or float the capsule within the pocket until the cap bumps against the marginal edges of the arcuate slot which edges then act to prevent further radially outwardly movement of the capsule. Accordingly, once the capsules with the caps positioned radially outwardly are rotated past the influence of the air jets, these capsules will remain radially oriented and seated within the radial portions of the pockets in the same orientation as originally deposited from the feed hopper.

A transfer drum of similar configuration to the feed drum is tangentially arranged and is rotatably driven in synchronism with the feed drum whereby the pockets in the transfer drum are tangentially brought into register with the pockets in the feed drum as the feed drum and the transfer drum are rotated in synchronism.

Those capsules which were longitudinally oriented by the air jet in the feed drum will be received in the transfer drum in the same longitudinal alignment. Those capsules which were radially oriented with the cap outwardly positioned will be radially transferred to a corresponding pocket in the transfer drum. The transfer of the capsules, whether in longitudinal or radial position, ideally proceeds by gravity. It may be assisted by air, such as an air jet which helps to dislodge and transfer the capsule. The transfer may also be assisted by a vacuum created in the pocket in which the capsule will be transferred, or other means. When the capsule has been transferred to the radial portion of the pocket in the transfer drum, its position is such that it will essentially have been turned upside down.

Unlike the apparatus described in U.S. Pat. No. 4,069,753 where the transferred capsules are turned from a transverse direction with respect to the machine travel, in the apparatus and method herein described the capsules remain in the same plane, i.e., radially, but they are inverted in the transfer. Moreover, the pockets of the apparatus described herein need not, and are not configured as the pockets of said patents which include a generally radially-directed pocket, a generally longitudinally-directed pocket, and a generally transversely-directed pocket. Nor does the pocket herein describe need an angularly sloping bottom surface as described in said patent.

It is to be noted that an important object of that patent and others designated above, is to dispose the capsule in a position well suited for direct spin printing, i.e., the transverse position relative the direction of the machine travel. Although not so positioned in the second drum, the machine in accordance with the invention can, in one of its embodiment also dispose the capsule in a position best suited for spin printing.

A second or lower back guide circumferentially overfits the transfer drum and is similarly equipped with an air jet means. As the transfer drum is rotated past the air jet, those capsules that are already longitudinally positioned in the longitudinal portion will be transversed through the lower back guide without further orientation with the body portion leading and the cap trailing. Those capsules which are radially positioned within the radially directed portions of the feed drum pockets, i.e. the capsules with their cap now radially inwardly positioned, will be acted upon by the air jet. The air jet thus assists to raise the capsule cap portion out of the pocket and to introduce the body into the arcuate space defined between the surface of the transfer drum and the back guide. The air jet acts to longitudinally align such capsules in the longitudinal portions of the pockets with the body portion leading and the cap trailing. Thus, the air operates in cooperation with the rotary movement of the drum and the occasional frictional engagement of the capsule with the inner portion of the back guide as the drum rotates and the pivoting movement of the capsule about the inside shoulder of the pocket.

Thus all of the capsules will be similarly oriented after handling by the feed drum and the transfer drum, whereby each capsule is positioned within the longitudinally extending portion of the pocket with the body in leading orientation and with the cap in trailing position.

A second vacuum chest may be provided to assist in the positioning of the capsules in this second drum.

The apparatus of the invention provides in the operations which follows several alternatives for handling or processing the capsule. The capsules can be transferred to a suitable conveyor means without changing the direction of the capsule, i.e. it will be longitudinally aligned or there is provided means for turning the capsule to a transverse position at right angle with the line of travel of the conveyor to ready each capsule for spin printing as the conveyor means carries the capsules to a spin printing station.

It is therefore an object of the present invention to provide an improved capsule rectification apparatus of the type set forth.

It is another object of the present invention to provide novel capsule rectification apparatus that is completely automatic in operation and which is designed to simply and speedily rectify a plurality of randomly fed capsules.

It is an important object of the present invention to provide an apparatus wherein the capsules are rectified and oriented in the one plane, the plane of rotation.

It is another object of the present invention to provide a novel capsule rectification apparatus comprising a feed drum and a tangential transfer drum, a back guide means provided in association with each drum and an air jet means associated with each drum wherein at least some of the capsules transported by the feed drum are longitudinally oriented by the feed drum air jet means and whereby the remaining capsules are longitudinally oriented by the air jet streams associated with the transfer drum.

It is another object of the present invention to provide a novel capsule rectification apparatus which includes a first feed drum which picks up capsules from a hopper in random arrangement, first orientation means to selectively rectify some of the capsules in the feed drum to a longitudinal position with respect to the path of movement, transfer means to transfer longitudinally oriented capsules from the first feed drum to a second transfer drum in longitudinal alignment, said transfer means further transferring radially oriented capsules from the first feed drum to the second transfer drum in radial alignment, second orientation means to longitudinally orient the remaining of said capsules in the second transfer drum from where they are deposited onto a conveyor means for further processing.

In accordance with the invention, the capsules may be so deposited on the conveyor means in a position ideally adapted for "spin printing" or, for printing the capsules positioned in longitudinal orientation with the direction of travel, rather than the capsules being positioned with their axes at approximately right angles to the path of travel, as is the case for spin printing.

It is another object of the present invention to provide a novel capsule rectification apparatus comprising a hopper containing a large number of capsules in random arrangement and first and second rotary drum means and first and second guide means including air jets, all of which are adapted to sort out and orient the capsules so that they are uniformly spaced apart about the second drum means in longitudinal orientation with the capsule body forwardly positioned and with the capsule caps rearwardly positioned relative to the direction of the travel.

It is another object of the present invention to provide a novel capsule rectification apparatus comprising a first feed drum, said drum including a plurality of pockets each having a radially directed portion and a longitudinally directed portion, a first capsule orientation means associated with the feed drum to longitudinally orient at least some of the capsules contained within the pockets, a transfer drum in tangential arrangement and synchronized movement with the feed drum, the transfer drum comprising a plurality of similar pockets each having a radially directed portion and a longitudinally directed portion, a second orientation means associated with the transfer drum whereby all capsules not longitudinally oriented by the first orientation means will be oriented in the transfer drum pocket by the second orientation means.

It is another object of the present invention to provide a novel capsule rectification apparatus that is simple in design, yet versatile and efficient.

Other objects and a fuller understanding of the invention will be had by referring to the following description and claims of a preferred embodiment thereof, taken in conjunction with the accompanying drawings, wherein like reference characters refer to similar parts throughout the several views, and in which:

BEST MODE FOR CARRYING OUT THE INVENTION

Although specific terms are used in the following description for the sake of clarity these terms are intended to refer only to the particular structure of the invention selected for illustration in the drawings, and are not intended to define or limit the scope of the invention.

Figure 1:
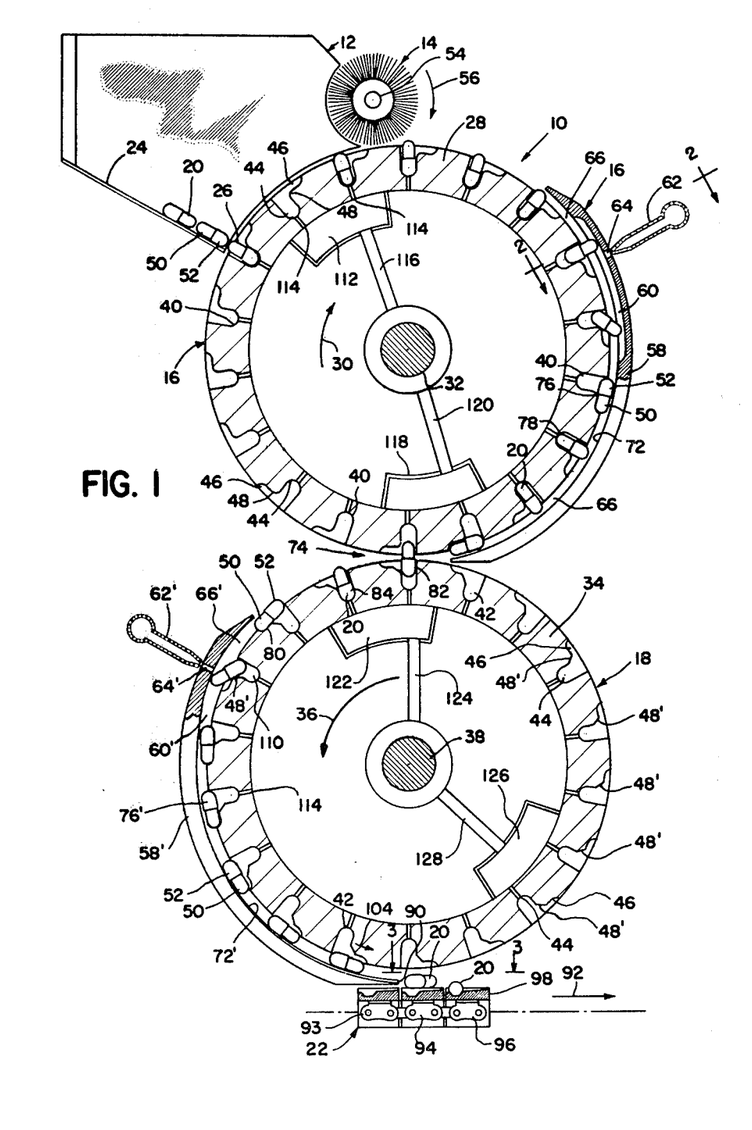
FIG. 1 is a side elevational view, partly in section, illustrating the preferred embodiment of the invention.

Referring now to the drawings, there is illustrated in FIG. 1 a capsule rectification apparatus designated 10 which comprises generally a hopper means 12, a rotary brush means 14, a feed drum means 16 and a transfer drum means 18, all of which cooperate to rectify a plurality of randomly oriented capsules 20 for deposit upon a conveyor means 22 in a preselected, rectified arrangement for printing or marking.

The hopper means 12 is mounted in stationary relationship upon a suitable support (not shown) and includes an inclined bottom 24 which terminates at a capsule opening 26 to facilitate feeding the capsules 20 one at a time to the drum means 16. As shown, the angle of inclination of the hopper bottom 24 is designed to radially align the bottom whereby the individual capsules will be radially fed toward the feed drum means 16.

However, a hopper may be used from which the capsules will be fed not only radially but also deposited in a longitudinal position in the cavity.

The feed drum means 16 comprises generally a feed drum 28 which is rotated in the direction of the arrow 30 by its associated shaft 32 in known manner. A similarly configured transfer drum 34 rotates in substantially tangential relationship below the feed drum 28 in the direction of the arrow 36 upon rotation of its affixed shaft 38. The shafts 32, 38, and their respectively affixed drums 28, 34 are rotated in synchronism by a motor and drive apparatus (not shown) in a suitable manner well known to those skilled in the art.

The feed drum 28 and transfer drum 34 are similar in construction and are each provided with a plurality of equally spaced, peripherally positioned, uniformly configured, capsule receiving pockets or depressions 40, 42. While a single peripheral row of pockets 40, 42 in each of the drums 28, 34 is illustrated, it will be appreciated that other similar rows can be transversely arranged about the peripheries of the respective feed drum 28 and transfer drum 34 to similarly feed and rectify simultaneously greater numbers of capsules 20, if so desired.

Still referring to FIG. 1, it will be observed that the feed drum pockets 40 and the transfer drum pockets 42 are substantially identical in that both pockets comprise a radially extending portion 44 and a communicating, longitudinally extending portion 46 which portions are defined one from the other by an intermediate shoulder 48. In other respects, the pockets in the respective drums can differ from each other. For instance, while there is a need for shoulder 48 or equivalent means to assist in the pivoting of the capsule, in the feed drum, there is no such requirement in the pockets in the transfer drum, where such shoulder 48' can well be shaped differently, e.g., be more slanted or at an incline, or otherwise as desired. The radially extending portions 44 and longitudinally extending portions 46 of the feed drum pockets 40 and transfer drum pockets 42 are sized and configured to receive and retain one of the capsules 20.

As hereinbefore set forth, the capsules can be conventional in configuration and comprise a generally cylindrical body 50 with a generally cylindrical cap 52 in overfitting, telescopic arrangement. The diameter of the cap 52 is slightly greater than the diameter of the capsule body 50 and it is this difference in size that is utilized for capsule rectification purposes in the manner hereinafter more fully described.

As illustrated in FIG. 1, a plurality of randomly oriented capsules 20 feed along the inclined bottom 24 of the hopper means 12 through the opening 26 and one capsule individually enters each of the pockets 40 as the feed drum 28 is rotated in direction of the arrow 30. The capsules 20 will be presented to the feed drum 28 in generally radial orientation and will be received within the radially extending portions 44 of the feed drum pockets 40. Some of the capsules 20 will fall naturally into the radially extending portions 44 in an upright position with the respective bodies 50 positioned radially outwardly from the caps 52. Others of the capsules 20 will fall naturally with the respective caps 52 positioned radially outwardly from the respective bodies 50, capsules fed to the hopper are initially in haphazard or random orientation. As the capsules gradually descend in the hopper, they become aligned into a radial position with the assistance of conventional combs or "fingers'-'—forming channels to form rows of the so-arranged capsules. It is to be noted however, that if a hopper is not so constructed, the capsules will fall also into the longitudinal cavity of the pockets and then be processed in accordance with the apparatus and method of the invention.

A vacuum chest 112 is positioned and functions as described hereinafter.

A rotary brush means 14 is positioned arcuately downstream from the hopper means 12 and is rotated by its shaft 54 in the direction of the arrow 56 to assist in sweeping out and away any capsules 20 that might be lying in a generally longitudinal position partially overlapping with a capsule in the radial position and to assist in sweeping any longitudinal oriented capsule into a radial position within its associated radially extending cavity portion 44, when that cavity is free.

Figure 2:
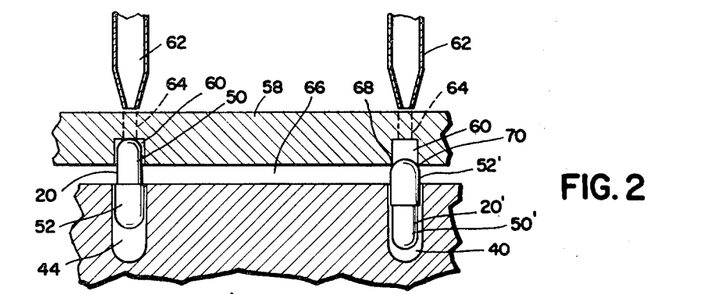
FIG. 2 is an enlarged, fragmentary, cross sectional view taken along line 2—2 of FIG. 1, looking in the direction of the arrows.

Referring now to FIGS. 1 and 2, it can be observed that feed drum means 16 further comprises an arcuate sizing block and back guide 58 which is positioned in circumferentially overlying relationship to the feed drum 28 at the lower quadrant thereof. At the upstream end, the sizing block and back guide 58 is provided with an arcuate slot 60 which extends in length over one or more of the spaced pockets 40 to facilitate capsule rectification therewithin. The sizing block and back guide 58 is spaced peripherally outwardly from the surface of the feed drum 28 to define an aligning space 66 therebetween, which space is less in width than the diameter of the body 50 of a capsule 20. The block and back guide 58 can be positioned anywhere against the feed drum in the space downstream the hopper and upstream the transfer point from one to the other drum. The length of the slot is a matter of judicious choice: when the rotational speed of the drum is comparatively fast, the slot preferably will extend over a plurality of pockets; desirably it will be shorter when the speed is lower. It is evident that the invention contemplates such slots or space to be of any length as may be desired.

Associated in operation with the feed drum means 16, an air jet 62 is suitably supported and positioned to direct a radial air stream through an opening 64, provided in the guide 52, into arcuate slot 60 for capsule orientation in the manner hereinafter more fully set forth.

Still referring to FIG. 2, two possible conditions are illustrated. In the left representation the capsule cap 52 is radially inwardly positioned within the radially extending pocket portion 44. In the right representation, the capsule body 50' is radially inwardly positioned within the radially extending pocket portion 44. Observing particularly the left representation, upon application of a jet of air from the air jet 62 through the opening 64, the air jet stream will impinge directly upon the pocket portions 46, 44 as the feed drum 28 is rotated. The directed air stream extends radially inwardly to the bottom of the radially extending pocket portion 44 where it turns and by applying forces against the bottom of the capsule, tends to urge the capsule 20 radially outwardly. In the case of the left representation in FIG. 2, it will be observed that the width of the slot 60 is just sufficient to admit the body 50 of the capsule 20 in rotary, sliding engagement therewithin. Once the capsule 20 has been raised within its respective pocket 40 by the force from the air jet 62, the capsule 20 will float within the space defined between the pocket 40 and the guide 58 and will pivot about the intermediate shoulder 48 to enter the longitudinally extending portion 46 of its pocket 40 in the manner illustrated in FIG. 1. The aligning space 66 defined between the outer periphery of the feed drum 28 and the guide 58 is just sufficiently wide to permit passage of a capsule 20 in its longitudinally aligned position with capsule body 50 forwardly positioned within the space 66 when positioned in a longitudinally extending pocket portion 46.

It may be noted that the smooth change of position of the capsule from the radial to the longitudinal position is assisted by the rotary travel of the drum while the capsule pivots into the direction of travel. Yet notwithstanding the, drag of the capsule on the interior of the guide, the capsule will not reseat itself radially into the pocket due to the size of the aligning space.

Referring now to the right capsule illustrated in FIG. 2, it will be observed that this capsule is oriented within the radially extending portion 44 in a position with the capsule body 50' extending radially downwardly and with the capsule cap 52' extending radially outwardly. Accordingly, when the jet of air from the air jet 62 is directed into the bottom of the pocket 40 in a manner to impinge upwardly upon the capsule 20' to force the capsule upwardly and radially outwardly from the pocket 40, the cap 52' will be urged toward engagement with the marginal edges 68, 70 which define the arcuate slot 60. However, as hereinbefore indicated, the width of the slot 60 is fabricated less than the diameter of the cap portion 52' and the marginal edges 68, 70 which define the slot 60 act to prevent the entrance of the capsule cap portion 52' into the slot 60. Under these circumstances, the capsule 20 cannot rise to pivot about the shoulder 48 and so will remain oriented within the pocket 40 in a radially directed position with the capsule body 50' positioned downwardly within the radially extending pocket portion 44. Accordingly, in this capsule orientation, the air stream from the air jet 62 cannot urge the capsule 20' into its longitudinally aligned position within the longitudinally extending portion 44. As the feed drum 28 continues to rotate in the direction of the arrow 30, the interior surface 72 of the guide 58 will act to maintain the capsule 20' in its radially extended position.

Accordingly, after the capsules 20 are rotated past the air jet 62, the capsules 20 approach the interface 74 between the feed drum 28 and the transfer drum 34 in either a longitudinally oriented position with the capsule body 50 leading as indicated at 76 or in radially oriented position with the capsule body 50 extending radially inwardly as indicated at 78.

The distance from the face of the guide 58 facing the drum may be adjusted by adjusting the guide; likewise the width of slot 60 can be constructed to admit different sized capsules, i.e. of different diameters.

Still referring to FIG. 1, there is provided a stationary vacuum chest 112 which is located immediately adjacent to the inner surface of feed drum means 16 to aid in seating the capsules 20 within the respective feed drum pockets 40 as the capsules are fed from the hopper means 12. The vacuum within the chest 112 is communicated with the individual pockets 40 through small holes or conduits as the pockets are rotated past the chest upon rotation of the feed drum means 16 in the direction indicated by the arrow 30. A conduit 116 interconnects the vacuum chest 112 with a known vacuum source, which may be introduced immediately adjacent to the feed drum shaft 32.

Since the capsules generally fall into the cavity of the drum in a radial position, the vacuum chest is provided as a further aid, but is not a requirement, to assist in seating such capsules.

In the lower portion of the feed drum below the horizontal at or approximately at the point of tangential contact of the feed drum 28 and the transfer drum 30 and the inclined bottom 24 of the hopper means 12. There is provided an air chest 118 immediately adjacent to the inner surface of the feed drum means 16. A conduit 120 communicates the interior of the air chest 118 with a known source of air, which source may be introduced immediately adjacent to the feed drum shaft 32 in any suitable, known manner. The air means, as described above, assist in the transfer of the capsules from one drum to the other by creating a back pressure on the bottom of the capsule to assist in dislodging it.

Similarly, the transfer drum means 18 can be equipped with a vacuum chest 122 with intercommunicating vacuum conduit 124 to aid in the capsule transfer and with an air chest 126 with intercommunicating air conduit 128 for clean out purposes.

The air chest 126 preferably is angularly spaced from vacuum chest 122 and is located below the horizontal in a position rotatively beyond the station of capsule discharge upon the conveyor means 22. This vacuum chest also is not necessary to the operation and for the machinery of the invention.

As above set forth and as illustrated in FIG. 1, it will be noted that transfer drum 34 is configured similarly to feed drum 28 and includes a plurality of similarly positioned, circumferentially spaced pockets 42 which are rotated into registry beneath the feed drum pockets 40 as the transfer drum 34 is rotated in synchronism in the direction of the arrow 36. As was noted above, the pockets need not be identical with those in the feed drum. When a longitudinally aligned capsule which has been oriented as indicated at 76 in the feed drum means 16 approaches the interface 74, transfer from the feed drum 28 to the transfer drum 34 will occur assisted or principally by gravity. The longitudinally oriented capsule will be received in the longitudinally extending pocket portion 46 of a transfer drum pocket 42 also in longitudinal alignment, as indicated at 80. It is noteworthy that the capsule body 50 will still be forwardly positioned in the desired orientation after transfer to the transfer drum 34.

When a radially positioned capsule 20 which is radially oriented within a feed drum pocket 40 as indicated at 78 approaches the interface 74, transfer from the feed drum 28 to the transfer drum 34 will occur assisted by or principally caused by gravity, as indicated by the numeral 82 as described above. It is noteworthy that after the transfer from the feed drum 28 to the transfer drum 34, the capsule 20 will still be radially oriented, but at this time within a transfer drum pocket 42. As illustrated, after transfer, the capsule cap 52 then will be downwardly or radially inwardly oriented within the radially extending portion 44 of the transfer drum pocket 42 as indicated at 84.

Referring to FIG. 1, it will be observed that the transfer drum means 18 includes an arcuate back guide 58' which includes an air jet 62' and an air jet opening 64'. The guide interior surface 72' defines an aligning space 66' between the back guide 58' and the outer periphery of the transfer drum 34. In the manner hereinabove set forth, the air jet 62' directs a stream of air through the opening 64' and into the bottom of each pocket 44 as the transfer drum 34 is rotated. Those capsules wherein the capsule body 50 has been radially positioned or oriented at transfer will be acted upon by the air stream.

The forces of the air blast will float the radially oriented capsules upwardly and out of the pocket portion 44 into the space 60' defined between the back guide 58' and the transfer drum 34. Elevation of a capsule 20 within its radial pocket portion 44 allows the capsule to pivot about the shoulder 48' as indicated at 110 to a longitudinally oriented position with the body portion 50 leading as indicated at 76'.

In this manner, all of the capsules 20 which were not longitudinally oriented by the feed drum means 16 at the upper feed drum 28 will be longitudinally oriented by the function of the transfer drum means 18 at the lower, transfer drum 34. The aligning space 66' defined between the periphery of the transfer drum 34 and the radially inward surface 72' of the guide 58' cams downwardly and serves to maintain the capsules 20 in their longitudinally oriented position with the respective capsule bodies 50 extending forwardly and the respective capsule caps 52 extending rearwardly relative to the direction of travel.

Figure 3:
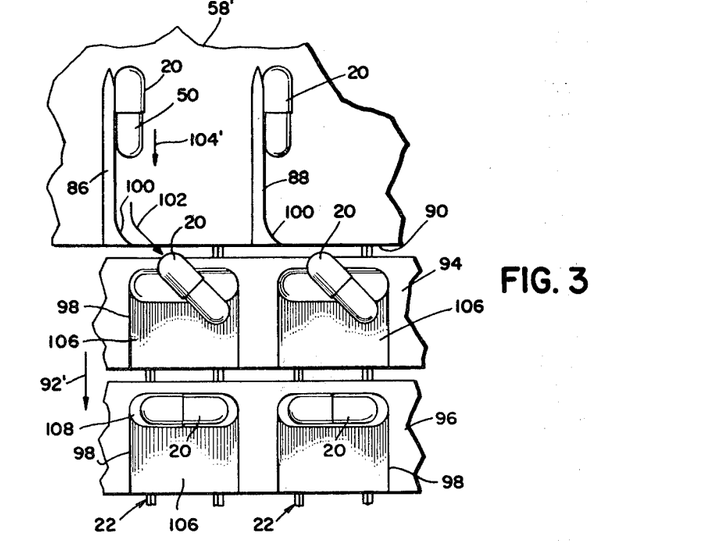
FIG. 3 is a fragmentary, cross sectional view looking from line 3—3 on FIG. 1.

Referring now to FIGS. 1 and 3, the lower back guide 58' terminates at its lower extremity in one or more side shoes, 86, 88 each of which is suitably aligned with a row of transfer drum pockets 42 to receive in sliding arrangement the rectified capsules 20 as indicated. As hereinbefore set forth, it is contemplated that pluralities of rows of peripherally spaced pockets 40, 42 will be provided in spaced arrangement along the peripheries of the feed drum 28 and the transfer drum 34 whereby a greater number of capsules 20 can be simultaneously and automatically rectified by providing increased multiples of pockets 40, 42. Accordingly, an additional side shoe 88 should be provided for each such additional row of circumferential pockets (not illustrated).

So positioned, the capsules travel on conveyor means 22 below lower terminus 90 of the transfer drum back guide 58' toward a spin printing station in the direction of the arrows 92, 92'. The conveyor means 22 comprises a plurality of interconnected links, three of which are indicated at 93, 94, 96. Each of the links upwardly carries a spin pocket means 98 which spin pocket means is transversely aligned to receive capsules 20 from each of the side shoes 86, 88 as indicated.

Still referring to FIGS. 1 and 3, it will be observed that each side shoe 86, 88 terminates in an arcuate bend 100 at the guide terminus 90 which bend is contacted by the capsule body 50 in a manner to turn each capsule as indicated by the arrow 102. The capsules drop upon the spin pocket means 98 at an angle to the direction of travel of the capsules 20 within pockets 42 of the transfer drum 34 as generally indicated by the arrows 104, 104'.

Each spin pocket means 98 comprises an inclined surface 106 which slopes downwardly toward the spin pocket 108 opposite the direction of travel indicated by the arrows 92, 92'. Each inclined surface 106 terminates rearwardly in a transverse spin pocket 108 of suitable size to receive and retain a capsule 20 therewithin in a manner to facilitate rotation of the capsule within the spin pocket 108 during the spin printing operation. As shown, the side shoes 86, 88 function to turn the rectified capsules 20 through ninety degrees and to drop the capsules upon the spin printing conveyor means 22 in the direction of the arrows 92, 92' and the incline of the surfaces 106 act to roll each capsule 20 into the respecrive spin printing station in rectified orientation.

Figure 6:
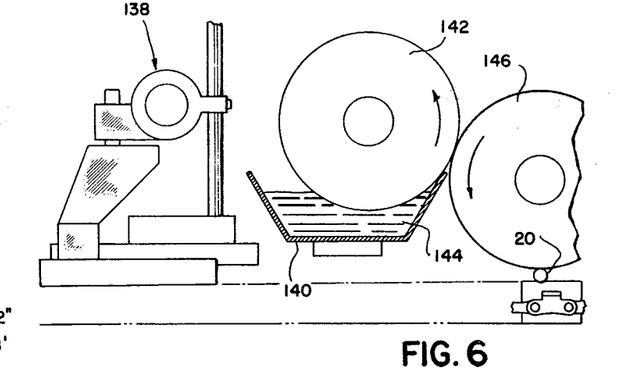
FIG. 6 is a side elevational view of a spin-printing station.

Now referring to FIG. 6, there is illustrated a spin printing apparatus which includes a reservoir 144 for a suitable marking dye or ink, transfer roll 142 and printing roll 146, which is continuously rotated as shown, in contact with the capsules 20 as they move underneath roller 146. Spin printing in connection with this type of machinery is illustrated in U.S. Pat. No. 3,871,295 which supplies the rectified capsules for spin printing only.

If desired, an air separator means, as illustrated in FIG. 6, may be positioned as shown. Such separator is described in U.S. Pat. No. 3,868,900.

The apparatus of the invention, however, can dispose and provide the capsules so that they need not be spin-printed but rather printed or otherwise processed, when in longitudinal alignment with the course of travel of the conveyor means.

Figure 4:
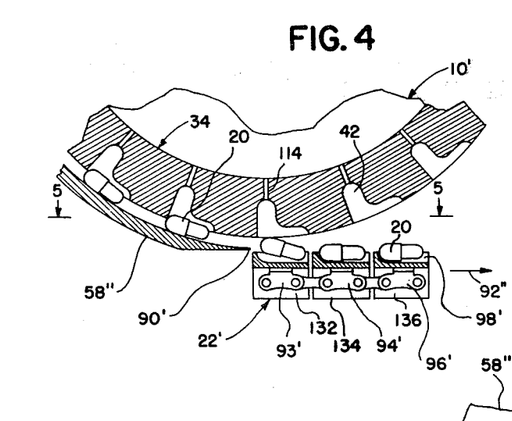
FIG. 4 is a partial, enlarged, side elevational view of a modified embodiment of the invention.
Figure 5:
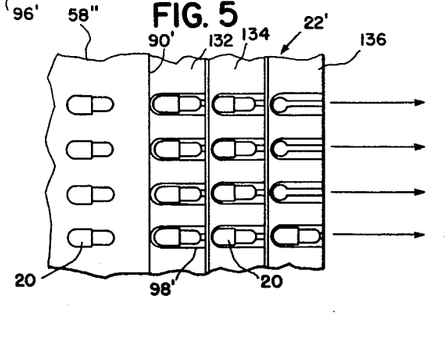
FIG. 5 is a fragmentary, cross-sectional view taken along line 5—5 in FIG. 4, looking in the direction of the arrows.

Referring now to FIGS. 4 and 5, there is illustrated a portion of a capsule rectification apparatus 10' wherein a back guide 58" is employed to guide the rectified capsules 20 toward a printing station (which is designated generally by reference numeral 138 in FIG. 6) in longitudinally aligned orientation. In that embodiment the device illustrated and described in conjunction with FIG. 3 for turning the capsules by 90° is not necessary since the capsules are deposited or transferred on the conveyor means without change of orientation.

In that embodiment, the longitudinally aligned and rectified capsules 20 exit the capsule rectification apparatus 10' at the back guide terminus 90' and are deposited in longitudinal alignment upon conveyor means 22'. Conveyor means 22' comprises a plurality of capsule carrier bars, three of which are indicated at 132, 134, 136, interconnected by suitable links 92', 94', 96'. The conveyor means 22' is provided with a plurality of pocket means 98', which pocket means are longitudinally oriented and are positioned to receive and transport the longitudinally oriented, rectified capsules 20 as they are delivered at the guide terminus 90' by the transfer drum 34. The longitudinally oriented capsules are then transported for further processing as may be desired, such as printing (not by spin-printing) or other marking as required.

Thus, once the capsules are deposited in the transverse pockets 98 as shown in FIGS. 1 and 3 or the longitudinal pockets 98' as illustrated in FIGS. 4 and 5, they may be transported by conveyor means 22, 22' for subsequent printing or packaging operations, or both, as may be desired.

Although the invention has been described with particular reference to capsules, it is intended and contemplated that any material whatever may be processed in and in accordance with the apparatus and process of the invention whenever the material processed have two ends and it is desired to position, orient or arrange these materials with one selected end forward and the other trailing. It is to be noted in that connection that the materials can be hollow or not filled or filled, etc. Also, it is not necessary that the material have a so-called cap and body portion, as is illustrated by way of example only, but the material may have a protrusion or asperity or other means or other shape, or be of such configuration that the one end of the body will not enter into slot or space 60', thus selectively permitting the body to enter the space by one of its ends but not by the other.

To be noted too is that other equivalent means to the air jet means are contemplated to move the body out of the pocket. Such means need not be positioned outwardly of the drums, but it is contemplated that it could be positioned inwardly the drum to urge the body upwardly towards slot 60.

It is noteworthy also that back guide 58' can be provided with an arcuate slot (similar to 60), like back guide 58, but that would be unnecessary since in the transfer drum there are no capsules with their enlarged portion facing upwardly. However, such provision makes the two back guides interchangeable on the machinery.

Although this invention has been described in conjunction with certain specific forms and certain modifications thereof, it will be appreciated that a wide variety of other modifications can be made without departing from the spirit of the invention. For example, some of the features of the invention may be used independently of other features, including the use or non-use of the vacuum chest and the use or non-use of other means. The capsule turning is capable of uses independent of spin printing, although it is admirably adapted for that use.

Especially equivalant means to achieve the stated and implicit objectives are within the scope of the invention. Moreover, several described components are optional, as described above. Accordingly, in accordance with this invention, various equivalent elements may be substituted for those shown and specifically described, and in many instances parts may be reversed in ways which will become apparent to those skilled in the art, all without departing from the scope and spirit of this invention as defined in the appended claims.

Although the invention has been described with a certain degree of particularity, it is understood that the present disclosure has been made only by way of example and that numerous changes in the details of parts may be resorted to without departing from the scope of the invention.

INDUSTRIAL APPLICABILITY

The machinery and process of the invention has wide and numerous applications wherever capsules or similar materials are to be transported from one location to another, these materials having dissimilar ends and where it is an objective to selectively position or orient or rectify these materials as may be required for eventual further processing.

What is claimed is:

1. Apparatus for transporting and orienting pharmaceutical capsules comprising:
a rotatable drum having a plurality of spaced apart pockets each having a longitudinal portion adapted for carrying said capsules in an orientation substantially parallel to the direction of rotation of said drum;
a back guide positioned adjacent said rotatable drum and extending over a selected arc length of said drum for retaining said capsules in said pockets and for releasing said capsules at a delivery point, said back guide having an arcuate side wall at said delivery point adapted to engage said capsules for shifting said capsules to an orientation at an angle to said direction of rotation of said drum at which said capsules are released by said back guide;
and transporting means positioned at said delivery point for receiving said released capsules.

2. Apparatus according to claim 1 wherein said arcuate side wall includes a first straight section extending substantially parallel to said direction of rotation of said drum and a second curved section extending across said direction of rotation of said drum.

3. Apparatus according to claim 2 wherein said back guide extends from above the axis of rotation of said drum to said delivery point.

4. Apparatus according to claim 3 wherein said pockets are arranged in a plurality of rows of pockets and said apparatus includes a plurality of arcuate side walls each aligned with a row of pockets.

5. Spin printing apparatus comprising:
means for supplying pharmaceutical capsules in random orientation;
rectifying means, including a rotatable transfer drum, for orienting said capsules in the same orientation, said transfer drum having a plurality of spaced apart pockets each having a portion for carrying rectified capsules in a direction parallel to the direction of rotation of said drum;
a back guide positioned adjacent said rotatable transfer drum for retaining said rectified capsules in said pockets and for releasing said capsules at a discharge point, said back guide having a wall at said discharge point extending across the path of movement of said capsules for shifting said capsules to an orientation transverse to said direction of rotation of said drum at which said capsules are released by said back guide;
a conveyor positioned adjacent said rotatable transfer drum at said discharge point and having a plurality of pockets which receive capsules released by said back guide for transporting said capsules away from said discharge point, said conveyor pockets disposed transverse to the direction of rotation of said drum and transverse to the direction of movement of said conveyor;
and a spin printer positioned adjacent said conveyor for printing indicia on said capsules.

6. Spin printing apparatus according to claim 5 wherein said back guide wall has a first straight section extending parallel to said direction of rotation of said rotatable transfer drum and a second curved section extending across said direction of rotation of said drum.

7. Spin printing apparatus according to claim 6 wherein said back guide extends from above the axis of rotation of said rotatable transfer drum to said discharge point.

8. Spin printing apparatus according to claim 7 wherein said drum pockets are arranged in a plurality of rows of pockets in said rotatable transfer drum, said conveyor pockets are arranged in a plurality of rows of pockets in said conveyor and aligned with said drum pockets, and said apparatus includes a plurality of back guide walls each aligned with a row of drum pockets and a row of conveyor pockets.

* * * * *